Patented Jan. 16, 1934

1,943,875

UNITED STATES PATENT OFFICE 1,943,875

CLEANING IRON AND STEEL

Adriaan Nagelvoort, Wilmington, Del., assignor to Delaware Chemical Engineering Company, Wilmington, Del., a corporation of Delaware No Drawing. Application January 30, 1933, Serial No. 654,359. Renewed December 2, 1933

4 Claims. (Cl. 148—8)

This invention relates to cleaning iron and steel; and it comprises a method of producing a true metallic surface on articles of iron, steel or ferrous alloys wherein such an article is exposed to the action of air containing a minute amount of carbonyl chlorid at a temperature between 100° and 200° C., being generally around but not much above 200° C., thereby removing iron oxid as vapors of ferric chlorid, the treating gas being then displaced by air and the article cooled; all as more fully hereinafter set forth and as claimed.

Cleaning iron and steel to produce a true metallic surface preparatory to tinning, galvanizing, plating, painting, etc. is an important technical problem; and the existing wet methods are not wholly satisfactory. Iron oxid can be removed by pickling with various acids in various ways and the pickle liquor washed off. But there is always wet metal exposed to air and before the metal can be dried there is a possibility of recurrence of oxidation. No satisfactory dry method of cleaning available for large scale work has been proposed. In dry methods there is a limitation to the temperatures which can be used without the clean surface picking up another coating of oxid on exposure to the air.

I have, however, found that I can provide a satisfactory and positive dry cleaning method by using warm air containing a limited amount of phosgen or carbonyl chlorid, $COCl_2$. Carbonyl chlorid, usually called phosgen, is a gas made by passing a mixture of equal volumes of chlorin and carbon monoxid through a catalyst, such as charcoal.

Phosgen has active reducing and chloridizing properties at high temperatures and is used in the arts for making various metallic chlorids. It is, perhaps, one of the most reactive gaseous chemicals known. It cannot, however, be used in admixture with air at any high temperature, since it burns, forming $CO_2$ and free chlorin.

I have, however, found that when a little carbonyl chlorid is mixed with air the mixture can be heated to a temperature somewhat above 200°, without burning the phosgen; and that such a mixture positively and quickly removes oxid from iron and steel, without in any way attacking the metal. At a temperature between 100° C. and 200° C., neither the phosgen nor the air attacks clean iron or steel; but the mixture does remove iron oxids, either black oxid or red oxid, positively and quickly. At the temperatures mentioned and under the circumstances, ferric chlorid is freely volatile and goes forward with the treating gas. The utilization of phosgen is good and the temperature is too low for the air to oxidize the ferric chlorid. While the air has no oxidizing function as regards the metal, clean steel being unaffected, it may have an oxidizing function in connection with the action of the $COCl_2$. At all events, ferrous oxid goes forward as ferric chlorid and the oxidizing action of the air probably contributes to this result.

In practical embodimen's of the present invention, a mixture of CO (advantageously made from producer gas) and chlorin is passed through a bed of charcoal. Any other convenient catalyst can be used for synthesizing carbonyl chlorid. The phosgen is added to air in a proportion sufficient to give 1 or 2 per cent of carbonyl chlorid by volume and the air-phosgen mixture passed over iron or steel at a temperature between 100° C. and 200° C. and, advantageously, not much above 200° C. Action takes place at 100° C., although rather slowly. The action speeds up with increase of temperature and at 200° C., which I regard as a safe temperature, the cleaning action is ex'remely rapid. The current of air and phosgen is followed by a current of air and the clean metal cooled. It is now suitable, without further treatment, for tinning, galvanizing, plating, painting, lacquering, etc.

Because of the speed and completeness of the action, the present invention may be applied in continuous methods of operation, as where hot wire is passed through a changing atmosphere of the air-phosgen mixture. The operating temperature, around 200° C., is low and there is no difficulty in heating either the work or a treating chamber to this temperature. In cleaning small objects like door knobs, pans, etc., they can be sent through a hot chamber of the general character of a bake oven, using an ordinary type of conveyor.

I ordinarily supply the phosgen-air mixture to the treating chamber at such a rate that the effluent gases are just free of phosgen. Similarly, in continuous apparatus the speed of the conveyor is so adjusted that the work comes out of the treating chamber free of oxid. On working under proper conditions, all that is necessary is to allow the work to cool after treatment.

On cooling the effluent gases from the treating apparatus, the ferric chlorid condenses and it may be recovered or sent to waste.

Utilization of phosgen is complete with ordinary methods of working and no nuisance is created. While phosgen is a gas of unpleasant and even dangerous properties, there is neither risk nor nuisance in using it in the described way for the described purposes. No great amount of it is in existence at any one time.

The present process, however, can be carried out with specially prepared phosgen from tanks or cylinders. But it is ordinarily simpler to make the phosgen as it is wanted and use it at once; and particularly as this enables the use of producer gas as a cheap source of CO.

What I claim is:

1. In cleaning iron and steel articles, the process which comprises exposing such articles to an atmosphere of air containing a minute amount of phosgen and at a temperature between 100° and 200° C.

2. The process of claim 1 wherein the temperature is maintained around 200° C.

3. The process of claim 1 wherein the air is admixed with 1 or 2 per cent of phosgen by volume.

4. The process of cleaning iron and steel articles which comprises transmitting such articles through an atmosphere of air containing a minute admixture of phosgen gas.

ADRIAAN NAGELVOORT.